(12) United States Patent
Paolini et al.

(10) Patent No.: US 6,657,617 B2
(45) Date of Patent: Dec. 2, 2003

(54) METHOD, APPARATUS AND COMPUTER PROGRAM PRODUCT FOR THREE DIMENSIONAL TEXT CREATION

(75) Inventors: Michael A. Paolini, Austin, TX (US); Lorin Evan Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 09/888,485

(22) Filed: Jun. 25, 2001

(65) Prior Publication Data

US 2002/0196257 A1 Dec. 26, 2002

(51) Int. Cl.[7] .................................................. G09G 5/00
(52) U.S. Cl. ..................... 345/173; 434/114; 340/407.1
(58) Field of Search ................................ 345/173–179; 434/113–115; 340/407.1; 421/27; 178/18.01–18.07

(56) References Cited

U.S. PATENT DOCUMENTS

| | | | | |
|---|---|---|---|---|
| 4,888,713 A | 12/1989 | Falk | ............... | 364/522 |
| 5,631,861 A | 5/1997 | Kramer | ............... | 703/7 |
| 5,701,444 A | 12/1997 | Baldwin | ............... | 395/506 |
| 5,717,423 A | 2/1998 | Parker | ............... | 345/108 |
| 5,729,671 A | 3/1998 | Peterson et al. | ............... | 395/123 |
| 5,736,978 A * | 4/1998 | Hasser et al. | ............... | 345/173 |
| 5,748,199 A | 5/1998 | Palm | ............... | 345/473 |
| 5,781,195 A | 7/1998 | Marvin | ............... | 345/428 |
| 5,811,930 A | 9/1998 | Krafcik et al. | ............... | 313/510 |
| 5,821,920 A | 10/1998 | Rosenberg et al. | ............... | 345/156 |
| 5,825,308 A | 10/1998 | Rosenberg et al. | ............... | 341/20 |
| 5,835,096 A | 11/1998 | Baldwin | ............... | 345/430 |
| 5,835,693 A | 11/1998 | Lynch et al. | ............... | 345/473 |
| 5,864,343 A | 1/1999 | Naughton et al. | ............... | 345/419 |
| 5,870,098 A | 2/1999 | Gardiner | ............... | 345/426 |
| 5,877,768 A | 3/1999 | Jain | ............... | 345/421 |
| 5,880,733 A | 3/1999 | Horvitz et al. | ............... | 345/355 |
| 5,887,995 A | 3/1999 | Holehan | ............... | 400/479.1 |
| 5,898,599 A | 4/1999 | Massie et al. | ............... | 345/161 |
| 5,903,270 A | 5/1999 | Gentry et al. | ............... | 345/419 |
| 5,903,278 A | 5/1999 | Mitchell et al. | ............... | 345/431 |
| 5,905,503 A | 5/1999 | Penna | ............... | 345/426 |
| 5,929,846 A | 7/1999 | Rosenberg et al. | ............... | 345/161 |
| 5,952,796 A | 9/1999 | Colgate et al. | ............... | 318/1 |
| 5,977,867 A * | 11/1999 | Blouin | ............... | 340/407.2 |
| 6,046,726 A * | 4/2000 | Keyson | ............... | 345/156 |
| 6,509,892 B1 * | 1/2003 | Cooper et al. | ............... | 345/173 |
| 6,535,201 B1 * | 3/2003 | Cooper et al. | ............... | 345/173 |

OTHER PUBLICATIONS

US 5,903,456, 5/1999, Schena et al. (withdrawn)

* cited by examiner

*Primary Examiner*—Bipin Shalwala
*Assistant Examiner*—Ricardo Osorio
(74) *Attorney, Agent, or Firm*—Leslie A. Van Leeuwen; Anthony V. S. England

(57) ABSTRACT

Information for receiving by a computer system has attributes which the computer system is capable of interpreting for displaying on a two-dimensional display device. The information includes background and character attributes, according to which the characters are displayable in a color or shade that contrasts to the background. At least one of the characters has a certain character attribute for two dimensionally displaying, such bold, italic, underlining, font type or color. The information is rendered in a delineation that is tactile-detectable on a control surface of a three-dimensional display device. As thus rendered, a representation of the background is rendered in a first plane, while a representation one of the characters has a top surface of the character rendered in a second plane, and a representation of the one of the characters having the certain character attribute has a top surface of the character rendered in a third plane.

24 Claims, 7 Drawing Sheets

METHOD, APPARATUS AND COMPUTER PROGRAM PRODUCT FOR THREE DIMENSIONAL TEXT CREATION

CROSS-REFERENCE TO RELATED APPLICATIONS

This application is related to the following co-pending applications which are assigned to the same assignee as the present application and are hereby incorporated herein by reference:

Application Ser. No. 09/466,437 (Applicant's docket AUS9-1999-0830-US1), "METHOD, SYSTEM AND PROGRAM FOR TOPOGRAPHICAL INTERFACING;" and Application Ser. No. 09/466,436 (Applicant's docket AUS9-1999-0831-US1), "METHOD AND SYSTEM FOR TOPOGRAPHICALLY AWARE JAVA VIRTUAL MACHINE OPERATING SYSTEM."

BACKGROUND

1. Field of the Invention

This invention relates to a user interface for a computerized device, and more particularly to rendering information for a user in a tactile-detectable delineation on a three-dimensional display device.

2. Related Art

Data processing systems typically rely on a pointing device and a data entry device for receiving inputs and a display device for visual display of data. Display devices are typically limited to displaying in two dimensions. While graphical achievements have been made in order to display a virtual three dimensional object, the three dimensional world is still limited to two dimensional visual representation with typical display devices.

Typical data entry devices include, for example, a keyboard, a keypad or other such devices through which data in the form of control indicia or some other symbol may be input. Data entry devices are limited in that they receive input in relation to fixed control indicia. There are a fixed number of keys, with the majority of the keys having fixed indicia. More recently developed vocal recognition devices may be used in lieu of a keyboard. However, because of privacy and environmental noise considerations, there are limitations on the usability of vocal recognition devices.

Pointing devices are limited in that they typically only provide visually represented association to a user. In addition, with such devices there is a reliance on the hand-eye coordination of the user. Also, most pointing devices are limited to non symbolic input, whereby the user must switch between pointing devices and data entry devices in order to accomplish tasks.

One area of development in interface devices concerns tactile detectable surfaces that convey information to a user. For example, hyper-Braille readers allows seeing impaired users to detect Braille letters from a tactile detectable surface. U.S. Pat. No. 5,736,978 discloses one such reader. U.S. Pat. No. 5,717,423 discloses a combination pointing device/display device, in which the display includes a tactile detectable surface.

The related application concerns an interface device which, in one embodiment, combines pointing, data entry and a display that has a tactile detectable aspect. The tactile detectable display provides topographical rendering of information. In one embodiment, the device includes a sensing system that detects force, magnitude and direction of user input.

Difficulties arise in using tactile detectable interface devices with conventional applications for a number of reasons, including legacy issues. There are a vast array of existing software applications that do not include features which support tactile detectable rendering of the information associated with or processed by the application. That is, these applications are capable of receiving information having standard attributes for displaying in a single plane on a two-dimensional display device, but which do not directly relate to three dimensional rendering. It would be impractical in many cases to modify and recompile these applications to enable them to support tactile detectable interface devices. Therefore a need exists to somehow directly interpret existing applications and information formatted for existing applications, without extensively modifying the information or the applications, so that they are compatible in real time with tactile detectable interface devices.

Several major limitations exist in these prior attempts to provide some three-dimensional or topographical interface. They apply primarily to closed systems or platform or application dependent systems. Alternately, they only support specific limited topographical elements or attributes.

Present Enterprise-type native applications depend on operating systems (OS's) to do underlying two-dimensional rendering of complex graphical objects for output devices. Application frameworks exist for two-dimensional applications, but not for three-dimensional applications, in which the applications can use application programming interfaces (APIs) to accomplish their programming tasks. It is very costly for OS Enterprise Stack Applications to generate three-dimensional data, since current three-dimensional hardware device surface input is not supported by the two-dimensional OS that the applications were developed for. As previously stated, in some cases it is not practical to recompile existing two-dimensional legacy applications.

Problems with prior efforts to implement three-dimensional and topographical systems within Java based systems include:

(1) Legacy java virtual machines (JVM's) today are aware in two-dimensional fashion only (x,y);

(2) JVM's today, which require a topographical input/output (I/O) device, have to coexist with existing I/O devices (display, audio, keyboard and mouse) and not negatively impact performance;

(3) JVM's today need to incorporate a closed loop control feedback system in order to support a topographical device (frameworks are needed to generically handle three-dimensional bi-directional feedback from the user and display three-dimensional topographical data;

(4) There are problems in converting legacy two-dimensional information and three-dimensional topographical information into topographical device specific information; and (5) Needs of topographical input and output devices are different than typical devices attached to JVM operating system.

In short, although Java systems permit a wider range of topographical attributes to be associated with their objects and provide the command structure to implement these additional attributes, since current Java systems operate with traditional native platform specific OS's, they do not support extended topographical interfaces. Each present system utilizes specific hardware and/or application modules for the particular closed system. These modules cannot be extended to other platforms and/or applications, and support only preprogrammed topological attributes. Thus, for Java based systems, which utilize JVM's, there is an even greater need for improvements in support for three-dimensional and topographical information.

SUMMARY OF THE INVENTION

The foregoing need is addressed in the following invention, according to which information is received by a computer system. The information has attributes which the computer system interprets for displaying in a single plane on a two-dimensional display device. According to the invention, the information is rendered in a delineation that is tactile-detectable to a user on a control surface of a three-dimensional display device. The control surface has a flexible material, a number of mechanisms dispersed about the flexible material, and a number of actuators for controlling a position of the mechanisms to adjust height of the flexible material, so that the control surface provides a three dimensional space.

For displaying on a two-dimensional display device, the information includes background and character attributes, according to which the characters are displayable in a color or shade that contrasts to the background. At least one of the characters has a certain character attribute for two dimensionally displaying, such bold, italic, underlining, font type or color. As rendered on the three-dimensional display device, a representation of the background is rendered in a first plane of the control surface space, while a representation one of the characters has a top surface of the character rendered in a second plane of the space, with the second plane being a first height above the first plane. A representation of the one of the characters having the certain character attribute has a top surface of the character rendered in a third plane of the space, where the third plane is a second height above the first plane.

This advantageously permits applications and information formatted for existing applications to be adapted in real time without extensively modifying the information or the applications, so that they are compatible with tactile detectable interface devices.

In another aspect, the characters for displaying in the conventional, two dimensional display are translated to Braille characters and for rendering as Braille character representations on the three dimensional display device.

In other aspects, the three-dimensional display device actuators are capable of providing a variable resistance to a force on the mechanisms so that the control surface can be rendered harder or softer by varying the resistance. Accordingly, in one application the representation of the background or a character on the control surface is rendered harder or softer responsive to whether the background or character has a certain two dimensional display related attribute. Also, the three-dimensional display device has elements for heating the mechanisms so that the control surface can be rendered hotter or cooler, and in one application the representation of the background or a character on the control surface is rendered hotter or cooler responsive to whether the background or character has a certain two dimensional display related attribute.

In a further aspect, the background is rendered smooth or rough on the control surface depending on an attribute of the background. That is, depending on the attribute the representation of the background on the control surface is either rendered in solely one plane of the space, or more than one plane of the space.

Other objects and advantages of the invention will become apparent upon reading the following detailed description and upon reference to the accompanying drawings.

DETAILED DESCRIPTION OF THE INVENTION

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
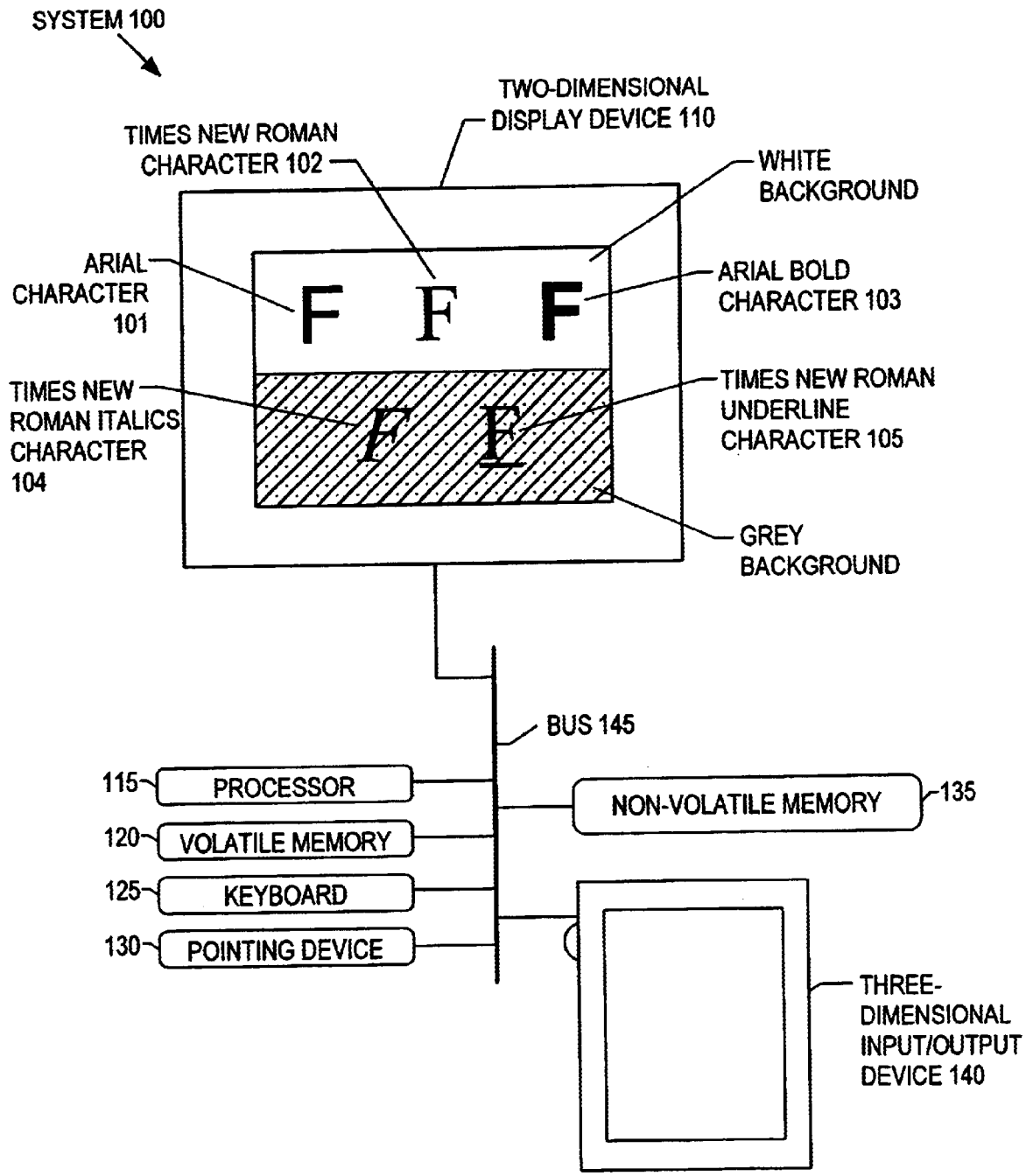
FIG. 1 illustrates a computer system 100 for an embodiment of the present invention.

Referring now to FIG. 1, a computer system 100 is shown for an embodiment of the present invention. The system 100 has a processor 115, a volatile memory 120 (that is, RAM), a keyboard 125, a pointing device 130, a nonvolatile memory 135 (for example, ROM, hard disk, floppy disk, CD-ROM, etc.), a two dimensional display device 110 and a three dimensional input output device 140. The components in the system 100 are interconnected by bus 145. The memory 120 and 135 are for storing a program for controlling the processor 115, and the processor is operative with the program to perform as described herein.

The three dimensional input/output device 140 is a device such as is described in the above cross-referenced and incorporated application, certain aspects of which are also described herein. The two dimensional display device 110 is shown in this embodiment because programs running on the system 100 include programs developed for such a conventional display 110. One aspect of the present invention concerns advantageously adapting such programs suited for a conventional display 110 to operate with the present display 140, or adapting information having attributes for displaying on a conventional display 110 to operate with the present display 140. In another embodiment, the system 100 does not include the two dimensional display device 110.

The two dimensional display device 110 shown could use a cathode ray tube ("CRT"), liquid crystal, field emission device, or some other type of conventional display element that provides a display substantially in a single plane. That is, although the display surface of device 110 may not achieve an ideal flatness and may instead be somewhat curved due to manufacturing limitations, it nevertheless presents images in substantially a single, albeit possibly curved plane. The images may, of course, be rendered so as to have the appearance or illusion of three dimensions, such as by shading, but the images are nevertheless rendered for displaying in two dimensions.

FIG. 1 illustrates a number of versions of the character "F" displayed against two different backgrounds on the two dimensional display device 110, both of which contrast with the characters. The top three characters 101 through 103 are displayed against a white background, while the bottom two characters 104 and 105 are displayed against a gray background (depicted in the FIG. by crosshatching). The character 101 displayed in the upper left-hand corner of device 110 is in an "Arial" font. That is, the character 101 has associated with it an attribute which a program running on the system 100 interprets in such a way as to render the character as shown on the display device 110, having the "Arial" font appearance. The character 102 just to the right of character 101 is displayed in a "Times New Roman" font. The character 103 just the right of character 102 is displayed in a bold version of the "Arial" font. That is, the character 102 has associated with it not only an attribute which the program running on the system 100 interprets in such a way as to render the character as shown on the display device 110 having the "Arial" font appearance, but also has associated with it an attribute which the program interprets so as to render the character with the bold appearance. The character 104 on the left in the bottom portion of the display, that is, in the gray background portion, has an "italics" attribute, while the character 105 just to the right has an "underline" attribute. (Since all the FIG's herein are black and white, the characters shown on the display device 110 in FIG. 1 are shown as black characters contrasting against a lighter background. However, it should be understood that the characters could be of any color, as could the background. It is common that for existing software applications on a conventional display device 110 the characters have a color or shade that contrasts to that of the background.)

Subsequent FIG's herein will illustrate how characters such as those shown in FIG. 1 are rendered on three-dimensional input/output device 140. However, first some details of the input and output device 140 are illustrated and described.

Figure 2:
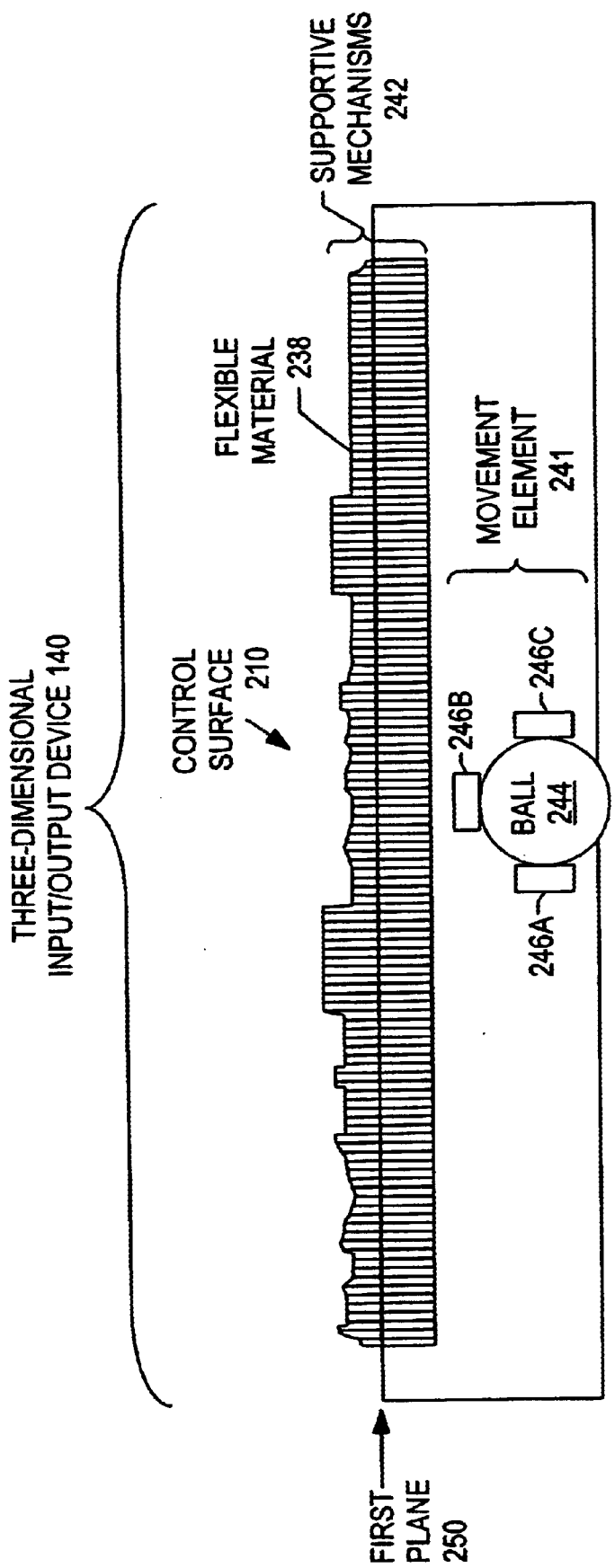
FIG. 2 illustrates a side view of a three-dimensional input/output device, according to an embodiment.

Referring now to FIG. 2, there is depicted a side view of the three-dimensional input/output device 140, according to an embodiment. The device 140 has a control surface 210 which includes a flexible material 238 and a number of supportive mechanisms 242 which are distributed about the flexible material 238. The numerous supportive mechanisms 242 are able to render information in a tactile-detectable delineation which they produce by selectively pushing against the flexible material 238 of the control surface to extend it above a first plane 250.

The device 140 also has a movement element 241, that includes a ball 244 which rotates responsive to user question the device 140 around on a flat surface, such as a table top. Rotation of the ball 244 is sensed by a number of different movement sensors 246A, 246B and 246C, as is well known in the art of pointing devices, one example of which is a mouse. The movement element 241 is used to provide input functionality for the device 140, according to which relative movement of the device 140 may be used to control the position of a pointer on the display 110 (FIG. 1). Furthermore, since the device 140 maybe used to display all or a portion of information that is conventionally displayed on display device 110, movement of device 140 may also be used to control what portion of that information is rendered on device 140.

Figure 3:
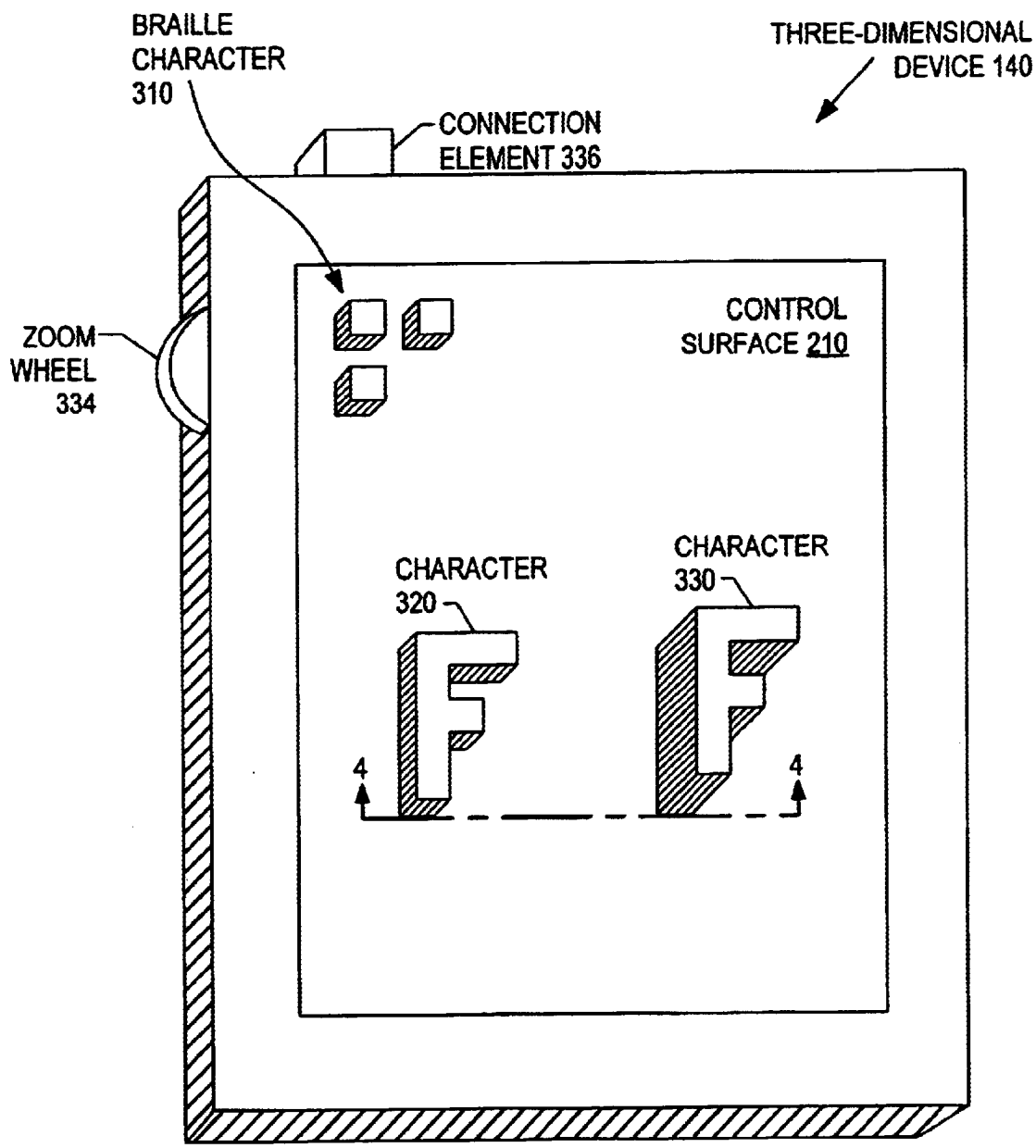
FIG. 3 shows additional aspects of the three-dimensional input/output device.

Referring now to FIG. 3, additional aspects of the three-dimensional input/output device 140 are shown. On the left-hand side of the device 140, as depicted, is a zoom wheel 334, for controlling the portion of information conventionally displayed on display device 110 that is to be displayed, that is, rendered, on device 140. Also shown, is a connection element 336, for connecting the device 142 the system 100 (FIG. 1). As depicted in FIG. 3, one of the "F" characters such as character 102 on the display device 110 has been translated by the system 100 into a Braille character "F" 310 and rendered on the control surface 210 of the device 140. That is, a representation in one form for display 110 of character 102 shown in FIG. 1 has been translated into another form, a Braille representation 310 of the character shown in FIG. 3. (It should be understood that all of the characters shown in FIG. 1 could be rendered as Braille representations on the device 140, and that a single Braille characters is shown merely for illustration purposes.)

Two of the "F" characters from FIG. 1 are shown rendered in the lower portion of the control surface 210 in FIG. 3. According to the embodiment, the character 320 shown in the lower portion on the left in FIG. 3 represents the "Arial" character 101 shown in FIG. 1, while the character 330 in the lower portion on the right in FIG. 3 represents the bold "Arial" character 103 shown in FIG. 1. Accordingly, the character 320 on the left is rendered with less height than the character 330 on the right, since the character 320 on the left represents a character that is not bold according to an attribute for the conventional display 110, while the character 330 on the right to represents a character that is bold according to an attribute for the conventional display 110.

Figure 4:
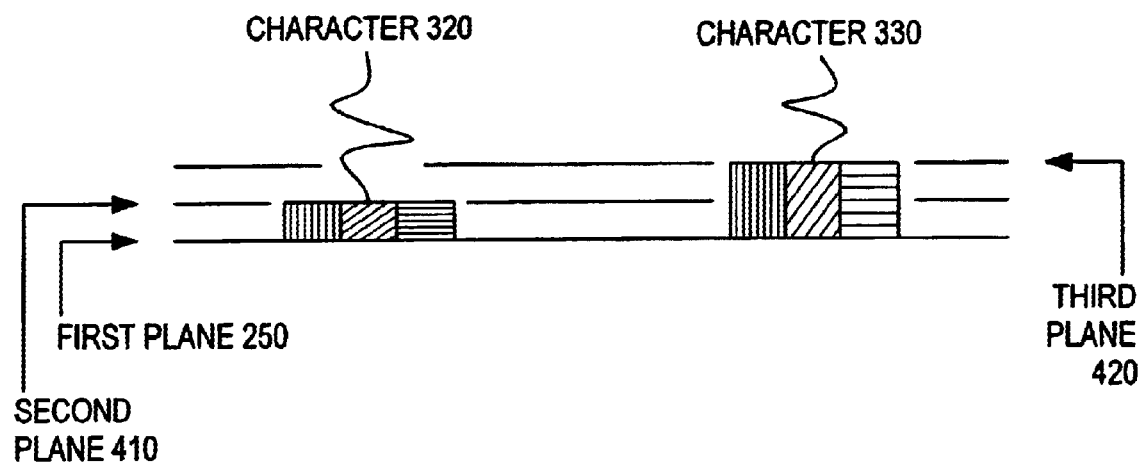
FIG. 4 illustrates further, in a elevation view, respective heights of two characters as rendered on the three-dimensional input/output device.

Referring now to FIG. 4, the respective heights of character 320 and character 330 are illustrated further in a elevation view of the portion indicated in FIG. 3. The white background of FIG. 1 is represented on the display device 140 as the first plane 250, as shown in FIG. 4. The top of character 320 is rendered on the display device 140 in the second plane 410. The top of character 330 is rendered on the display device 140 in the third plane 420. The second plane 410 is not as high above the first plane 250 as is the third plane 420, since the third plane 420 is the plane for the top of the character 330, which represents bold character 103 (FIG. 1).

Figure 5:
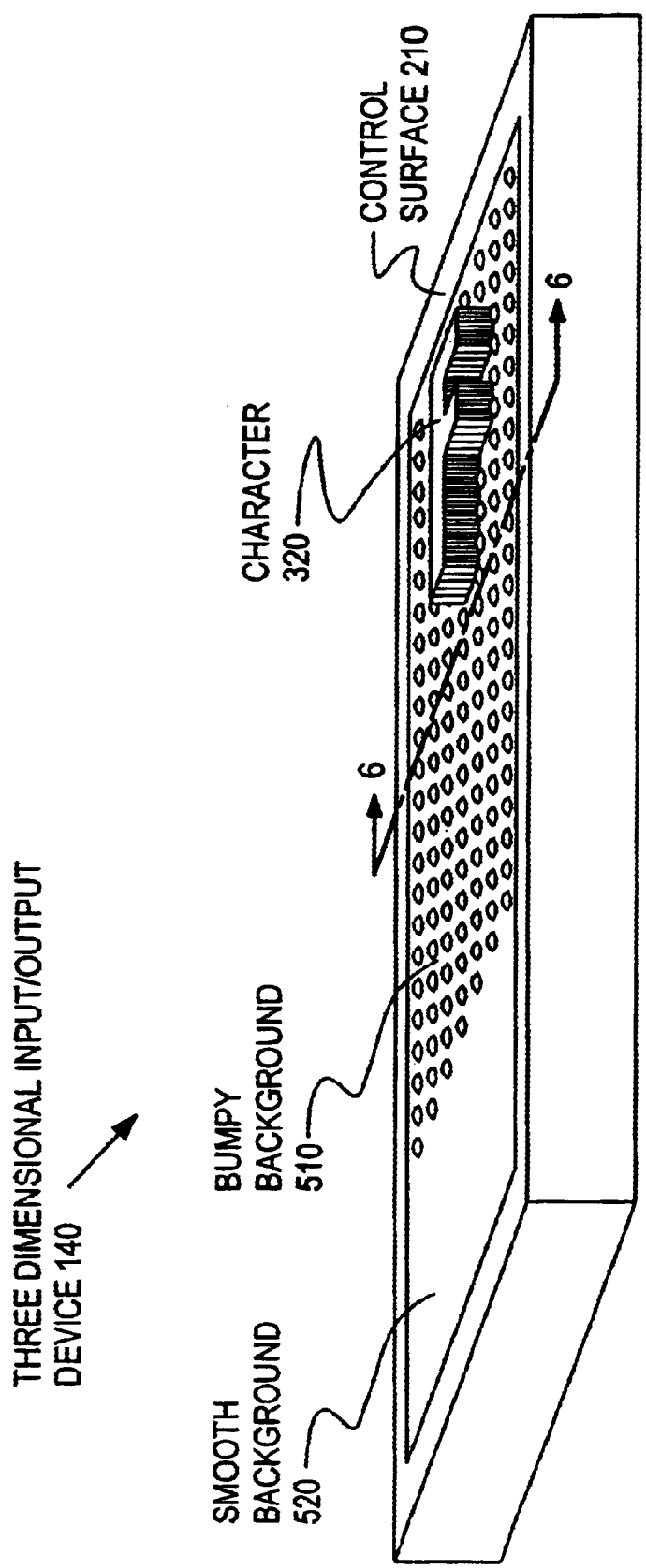
FIG. 5 shows a portion of information from the two dimensional display device of FIG. 1, as that information is rendered on the three-dimensional input/output device.

Referring now to FIG. 5, a portion of the information shown on the display device 110 (FIG. 1) is rendered on the three-dimensional input/output device 140. In this embodiment, the background 510 surrounding the character 320 is rendered bumpy responsive to the background having a certain attribute. That is, since the background is white nearby the character 101 for the two dimensional display 110, the corresponding background 510 in this embodiment is rendered bumpy surrounding the character 320, which represents character 101 on the three-dimensional input/output device 140. Further to the left in FIG. 5, the background 520, which represents a portion of the gray background in FIG. 1, is rendered as a smooth surface in a single plane, i.e., the first plane 250 (FIGS. 2 and 6).

Figure 6:
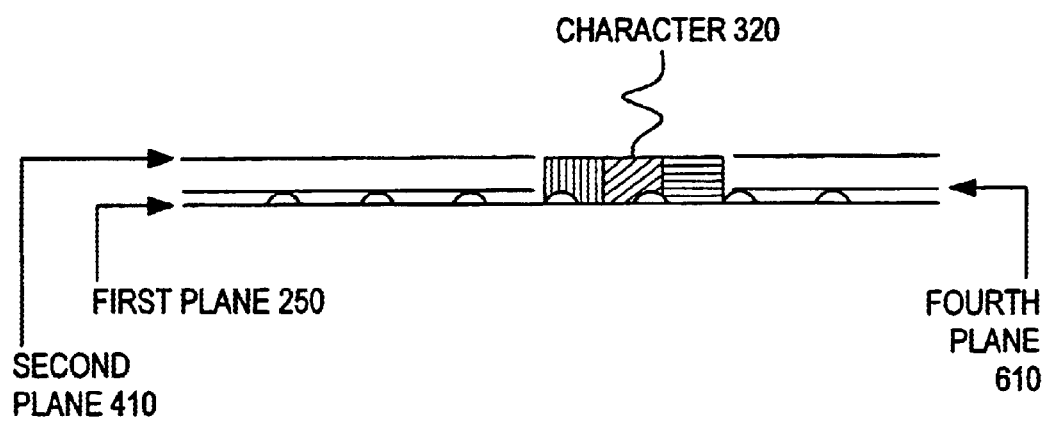
FIG. 6 illustrates further the respective heights of a character and bumps in the background, as rendered on the three-dimensional input/output device.

Referring now to FIG. 6, the respective heights of character 320 and the bumps in the background are illustrated further in a elevation view of the portion indicated in FIG. 5. The white background of FIG. 1 is represented on the display device 140 as the first plane 250 with bumps 605 thereon, the tops of which are in the fourth plane 610, as shown in FIG. 4. As previously, the top of character 320 is rendered on the display device 140 in the second plane 410. In this embodiment, the fourth plane 610 is not as high above the first plane 250 as is the second plane 410. However, it should be understood that the fourth plane 610 is not necessarily higher or lower than the second plane 410 nor the third plane 420 (FIG. 4).

Figure 7:
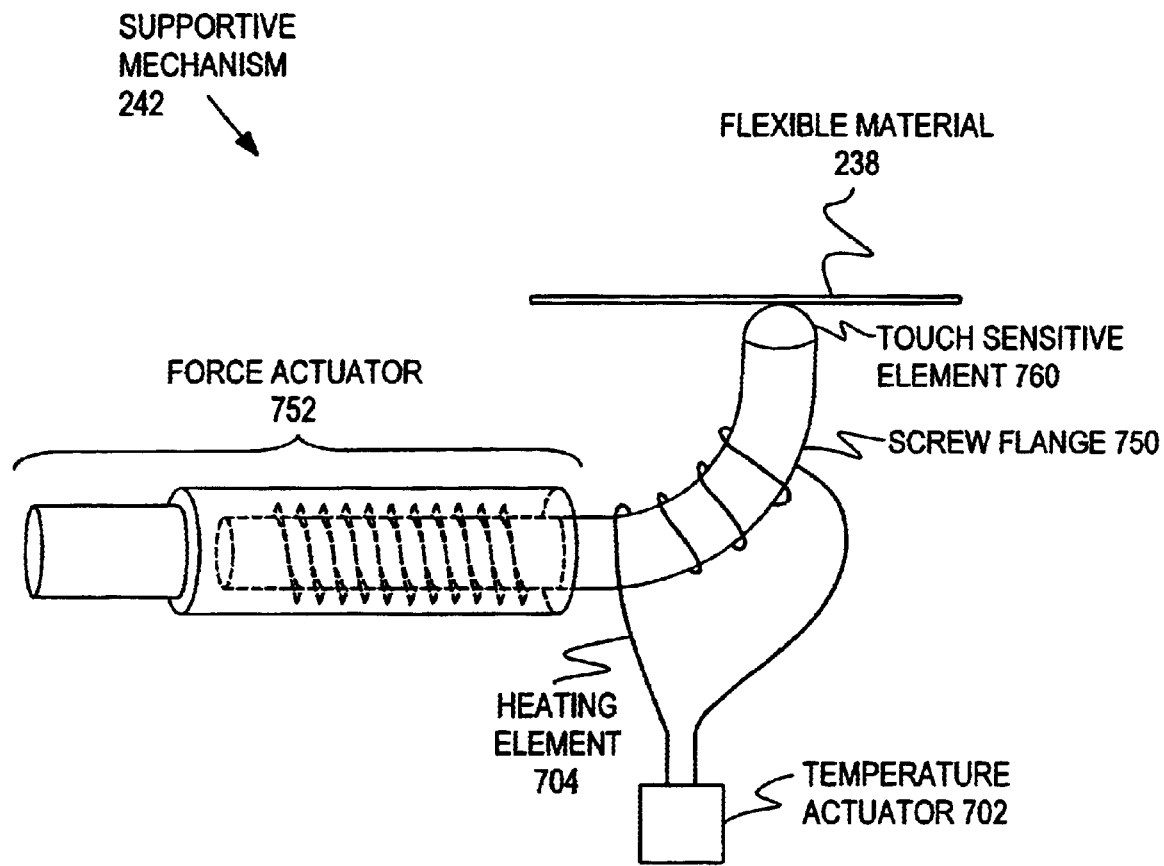
FIG. 7 illustrates an embodiment of one supportive mechanism of the three-dimensional input/output device.

Referring now to FIG. 7, an embodiment of one supportive mechanism 242 is illustrated. It should be understood that this supportive mechanism 242 shown in FIG. 7 is one of the numerous supportive mechanisms shown in FIG. 2. As shown, flexible material 238 is adjusted by the position of a screw flange 750. An actuator 752 rotates screw flange 750 to control the internal force that screw flange 750 places on flexible material 238. In addition, actuators 752 controls the resistance of screw flange 750 such that if the external pressure is applied, the position of screw flange 750 may be adjusted with a particular resistance. That is, the flexible membrane 238 of control surface 210 (FIG. 2) can be rendered harder or softer by varying the resistance. A controller provides control signals to actuator 752 that designates the desired position and resistance of screw flange 750. Thus, responsive to whether a background or character has a certain attribute for displaying on the two dimensional display device 110 (FIG. 1), the character or background may be rendered harder or softer on the control surface 210 of the three dimensional input/output device 140.

Also shown in FIG. 7 is a temperature actuator 702 coupled to the screw flange 750 by a heating element 704. A controller provides control signals to actuator 702 that designates the desired heating for screw flange 750. Thus, by use of the temperature actuator 702 the character or background may be rendered hotter or cooler on the control surface 210 of the three dimensional input/output device 140 responsive to whether a background or character has a certain attribute for displaying on the two dimensional display device 110 (FIG. 1).

Figure 8:
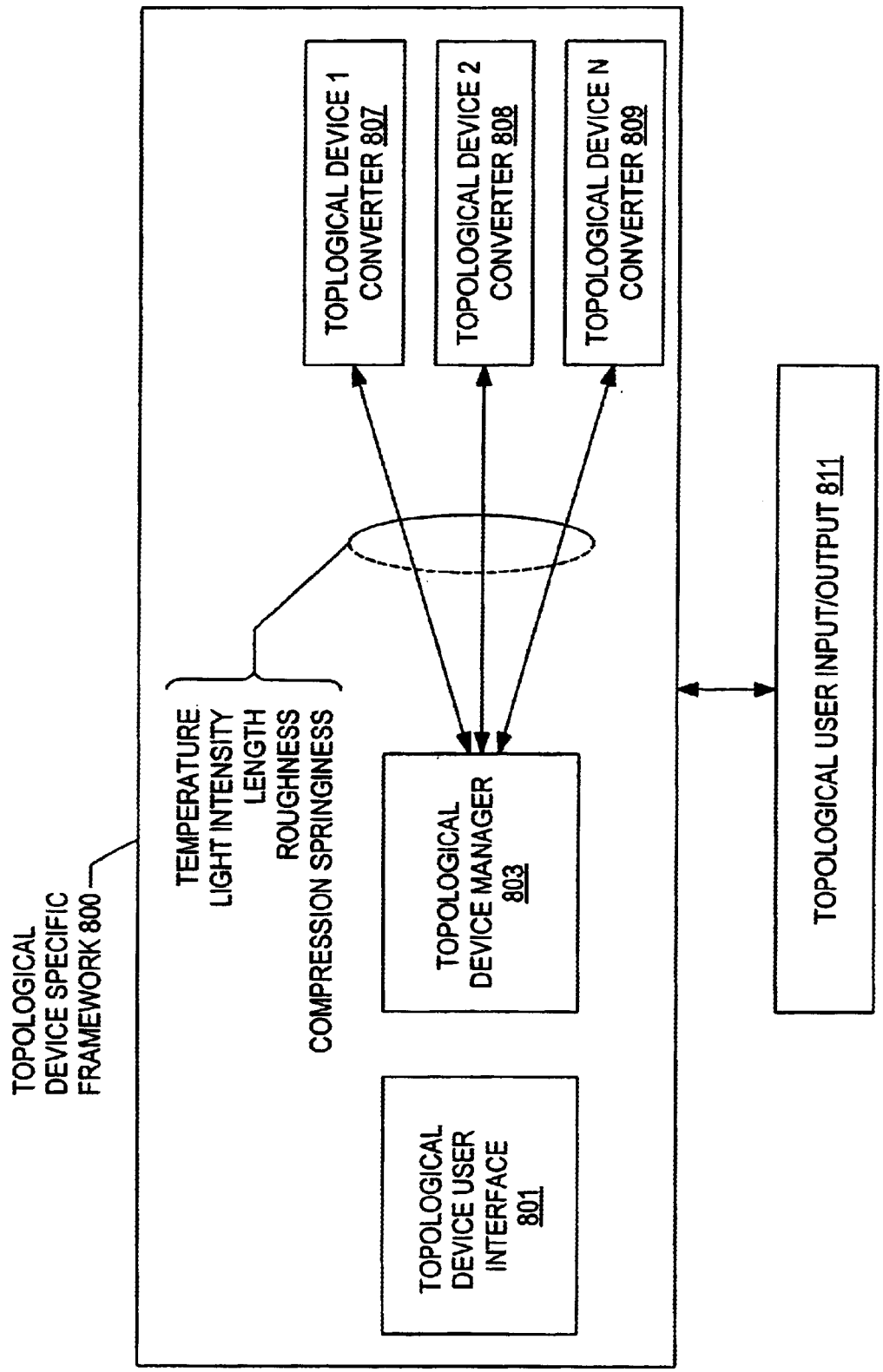
FIG. 8 depicts a device specific framework with specific topographical converters, according to an embodiment of the invention.

FIG. 8 illustrates a topographical device specific framework 800 which supports several different topographical devices. The topographical device user interface 801 contains device specific properties and device shared properties such as zoom (x,y,z). Topographical device manager 803 knows which topographical device is required to convert the particular topographical input signal and selects the applicable converter. Several topographical device converters or filters are illustrated ranging from device 1 807, device 2 808 to device n 809. Device 1 807 may be, for example, temperature converter, while device 2 808 is roughness converter and device n 809 is illumination converter. In one preferred embodiment, an optional topographical database (not shown) is used to store user configuration data. Topographical device manager 803 operates for light intensity, length, roughness, temperature, and compression springiness, and other types of topographical attributes each of which has its respective converter 807, 808, etc. The converters are implemented utilizing software code resident within OS code or linked as a subroutine to OS code. Applicable hardware and/or firmware devices such as device 140 (FIG. 1) are provided with output 811 from the converters to render the particular attribute and provide input 811 to the interface 801.

It is important to note that while the present invention has been described in the context of a fully functioning data processing system, those of ordinary skill in the art will appreciate that the processes of the present invention are capable of being distributed in the form of a computer readable medium of instructions in a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present embodiment has been presented for purposes of illustration, but is not intended to be exhaustive or to limit the invention to the form disclosed. Many modifications and variations will be apparent to those of ordinary skill in the art. For example, while device 140 has been described herein as a three-dimensional input/output device, it should be understood that in another embodiment the device is a three-dimensional display, i.e., output, device, and in another embodiment the device is a three-dimensional input device. Also, while device 140 has been illustrated with a trackball type of movement element 241, it should be understood that in other embodiments other types of movement tracking elements are used, one example of which is an optical tracking device. In addition, while a limited number of rendering features have been described, including rendering height, heat and hardness, that is, resistance to user force, it should be understood that in other embodiments other features are rendered. For example, in one embodiment a portion of the control surface, such as a character or portion of background, is rendered in such a way as to shine a light.

Further, a character that has a bold attribute for a conventional two dimensional display is shown herein rendered higher for the present three dimensional i/o device than the same character without the bold attribute. However, it should be understood that the higher rendering may also be responsive to some other attribute for the conventional display, such as italic, underlining, font type (for example, Helvetica, Arial, Times New Roman, etc.), color, etc. It should be also understood that the higher or lower rendering, hotter or colder rendering, etc. may be combined. In one embodiment, for example, characters which have a bold attribute and a point size attribute of 14 points or greater are rendered as higher and relatively hot, while characters which have the bold attribute but a point size that is lower than 14 points are rendered as higher but not hot.

It should also be understood that the invention is well-suited for use with numerous conventional applications, including book readers and browsers.

To reiterate, the embodiments were chosen and described in order to best explain the principles of the invention and its practical applications, and to enable others of ordinary skill in the art to understand the invention. Various other embodiments having various modifications may be suited to a particular use contemplated, but may be within the scope of the present invention.

What is claimed is:

1. A method for a user interface, the method comprising the steps of:

a) receiving information including a background and characters, wherein at least one of the characters has a certain character attribute, the information being displayable in a single plane on a two-dimensional display device, wherein the characters are displayable in a color or shade that contrasts to the background; and b) rendering the information for a user on a control surface of a three-dimensional display device, wherein the control surface has a flexible material, a number of mechanisms dispersed about the flexible material, and a number of actuators for controlling a position of the mechanisms to adjust height of the flexible material so that the control surface provides a three dimensional space, wherein a representation of the background is rendered in a first plane of the space, a representation of one of the characters has a top surface of the character rendered in a second plane of the space, the second plane having a first height above the first plane, and a representation of the one of the characters having the certain character attribute has a top surface of the character rendered in a third plane of the space, the third plane having a second height above the first plane.

2. The method of claim 1, comprising the step of:
translating the characters to Braille characters, wherein the step of rendering the information comprises rendering representations of the characters as Braille representations of the characters.

3. The method of claim 1, wherein the certain character attribute is bold, italic, underlining, font or color.

4. The method of claim 1, wherein the three-dimensional display device actuators are capable of providing a variable resistance to a force on the mechanisms so that the control surface can be rendered harder or softer by varying the resistance, and wherein the representation of the background on the control surface is rendered harder or softer responsive to whether the background has the background attribute.

5. The method of claim 1, wherein the three-dimensional display device actuators are capable of providing a variable resistance to a force on the mechanisms so that the control surface can be rendered harder or softer by varying the resistance, and wherein the representation of one of the characters on the control surface is rendered harder or softer responsive to whether the character has the character attribute.

6. The method of claim 1, wherein the three-dimensional display device comprises elements for heating the mechanisms so that the control surface can be rendered hotter or cooler, and wherein the representation of the background on the control surface is rendered hotter or cooler responsive to whether the background has a certain background attribute.

7. The method of claim 1, wherein the three-dimensional display device comprises elements for heating the mechanisms so that the control surface can be rendered hotter or cooler, and wherein the representation of one of the characters on the control surface is rendered hotter or cooler responsive to whether the character has the character attribute.

8. The method of claim 1, wherein step b) renders the representation of the background on the control surface in: i) solely a third plane of the space, or ii) third and fourth planes of the space, the third plane having a third height and the fourth plane having a fourth height, wherein the rendering of the background in solely the third plane or third and fourth planes is responsive to whether the background has a certain background attribute.

9. A computer system comprising:
a tatctile-detectable display device having a control surface, wherein the control surface has a flexible material, a number of mechanisms dispersed about the flexible material, and a number of actuators for controlling a position of the mechanisms to adjust height of the flexible material so that the control surface provides a three dimensional space having length, width and height dimensions;
a processor; and
a memory for storing a program, wherein the processor is operable with the program for receiving information including characters, wherein at least one of the characters has a certain character attribute, the information being displayable in a single plane on a two-dimensional display device, wherein the characters are displayable in a color or shade that contrasts to the background, and the processor is operable with the program for rendering the information for a user on a control surface of a three-dimensional display device, wherein the control surface has a flexible material, a number of mechanisms dispersed about the flexible material, and a number of actuators for controlling a position of the mechanisms to adjust height of the flexible material so that the control surface provides a three dimensional space having length, width and height dimensions, wherein a representation of one of the characters is displayed in a first plane of the space, the first plane having a first height, and a representation of one of the characters having the character attribute is displayed in a second plane of the space, the second plane having a second height.

10. The computer system of claim 9, wherein the processor is operable with the program for translating the characters to Braille characters, and wherein the rendering the information comprises rendering representations of the characters as Braille representations characters.

11. The computer system of claim 9, wherein the character attribute is bold, italic, underlining, font or color.

12. The computer system of claim 9, wherein the information includes a background, wherein the three-dimensional display device actuators are capable of providing a variable resistance to a force on the mechanisms so that the control surface can be rendered harder or softer by varying the resistance, and wherein the step of rendering the information on the control surface of the three-dimensional display device comprises the step of:
rendering on the control surface a representation of the background, wherein the representation is rendered harder or softer responsive to whether the background has the background attribute.

13. The computer system of claim 9, wherein the three-dimensional display device actuators are capable of providing a variable resistance to a force on the mechanisms so that the control surface can be rendered harder or softer by varying the resistance, and wherein the rendering of the information on the control surface of the tactile-detectable display device comprises rendering on the control surface a representation of one of the characters, wherein the representation is rendered harder or softer responsive to whether the character has the character attribute.

14. The computer system of claim 9, wherein the information includes a background, wherein the tactile-detectable display device comprises elements for heating the mechanisms so that the control surface can be rendered hotter or cooler, and wherein the rendering of the information on the control surface of the tactile-detectable display device comprises rendering on the control surface a representation the background, wherein the representation is rendered hotter or cooler responsive to whether the background has a certain background attribute.

15. The computer system of claim 9, wherein the tactile-detectable display device comprises elements for heating the mechanisms so that the control surface can be rendered hotter or cooler, and wherein the rendering of the information on the control surface of the tactile-detectable display device comprises rendering on the control surface a representation of one of the characters, wherein the representation is rendered hotter or cooler responsive to whether the character has the character attribute.

16. The computer system of claim 9, wherein the information includes a background, and wherein the rendering includes rendering of a representation of the background in: i) solely a third plane of the space, or ii) third and fourth planes of the space, the third plane having a third height and the fourth plane having a fourth height, wherein the rendering of the background in solely the third plane or third and fourth planes is responsive to whether the background has a certain background attribute.

17. A computer program product for a user interface, the product comprising:

instructions for receiving information including characters, wherein at least one of the characters has a certain character attribute, the information being displayable in a single plane on a two-dimensional display device, wherein the characters are displayable in a color or shade that contrasts to the background; and instructions for rendering the information for a user on a control surface of a three-dimensional display device, wherein the control surface has a flexible material, a number of mechanisms dispersed about the flexible material, and a number of actuators for controlling a position of the mechanisms to adjust height of the flexible material so that the control surface provides a three dimensional space having length, width and height dimensions, wherein a representation of one of the characters is displayed in a first plane of the space, the first plane having a first height, and a representation of one of the characters having the character attribute is displayed in a second plane of the space, the second plane having a second height.

18. The computer program product of claim 17, comprising:

instructions for translating the characters to Braille characters, wherein the step of rendering the information comprises rendering representations of the characters as Braille representations characters.

19. The computer program product of claim 17, wherein the character attribute is bold, italic, underlining, font or color.

20. The computer program product of claim 17, wherein the information includes a background, wherein the three-dimensional display device actuators are capable of providing a variable resistance to a force on the mechanisms so that the control surface can be rendered harder or softer by varying the resistance, and wherein the instructions for rendering the information on the control surface of the three-dimensional display device comprise:

instructions for rendering on the control surface a representation of the background, wherein the representation is rendered harder or softer responsive to whether the background has the background attribute.

21. The computer program product of claim 17, wherein the three-dimensional display device actuators are capable of providing a variable resistance to a force on the mechanisms so that the control surface can be rendered harder or softer by varying the resistance, and wherein the instructions for rendering the information on the control surface of the tactile-detectable display device comprise:

instructions for rendering on the control surface a representation of one of the characters, wherein the representation is rendered harder or softer responsive to whether the character has the character attribute.

22. The computer program product of claim 17, wherein the information includes a background, wherein the tactile-detectable display device comprises elements for heating the mechanisms so that the control surface can be rendered hotter or cooler, and wherein the instructions for rendering the information on the control surface of the tactile-detectable display device comprise:

instructions for rendering on the control surface a representation the background, wherein the representation is rendered hotter or cooler responsive to whether the background has a certain background attribute.

23. The computer program product of claim 17, wherein the tactile-detectable display device comprises elements for heating the mechanisms so that the control surface can be rendered hotter or cooler, and wherein the instructions for rendering the information on the control surface of the tactile-detectable display device comprise:

instructions for rendering on the control surface a representation of one of the characters, wherein the representation is rendered hotter or cooler responsive to whether the character has the character attribute.

24. The computer program product of claim 17, wherein the information includes a background, and wherein the instructions for rendering include instructions for rendering a representation of the background in: i) solely a third plane of the space, or ii) third and fourth planes of the space, the third plane having a third height and the fourth plane having a fourth height, wherein the rendering of the background in solely the third plane or third and fourth planes is responsive to whether the background has a certain background attribute.

* * * * *